US011867659B2

(12) United States Patent
Furuta et al.

(10) Patent No.: US 11,867,659 B2
(45) Date of Patent: Jan. 9, 2024

(54) SENSOR ELEMENT AND GAS SENSOR (71) Applicant: NGK SPARK PLUG CO., LTD., Nagoya (JP)

(72) Inventors: Hitoshi Furuta, Nagoya (JP); Kentaro Kamada, Nagoya (JP); Akinori Kojima, Nagoya (JP); Satoshi Yamahara, Nagoya (JP); Akihiro Hara, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 154 days.

(21) Appl. No.: 16/853,207

(22) Filed: Apr. 20, 2020

(65) Prior Publication Data
US 2020/0340940 A1 Oct. 29, 2020

(30) Foreign Application Priority Data

Apr. 23, 2019 (JP) ................................. 2019-081474
Dec. 4, 2019 (JP) ................................. 2019-219276

(51) Int. Cl.
*G01N 27/409* (2006.01)
*G01N 27/41* (2006.01)
(Continued)

(52) U.S. Cl.
CPC ......... *G01N 27/409* (2013.01); *G01N 27/406* (2013.01); *G01N 27/4071* (2013.01);
(Continued)

(58) Field of Classification Search
CPC .... G01N 27/409; G01N 27/41; G01N 27/406; G01N 27/4067; G01N 27/407–4077; G01M 15/102
See application file for complete search history.

(56) References Cited

U.S. PATENT DOCUMENTS 6,068,747 A * 5/2000 Tojo ..................... G01N 27/417
204/426
2002/0017461 A1* 2/2002 Kunimoto ............ G01N 27/419
204/424
(Continued)

FOREIGN PATENT DOCUMENTS

JP 2002-005883 A 1/2002
JP 2003294687 A * 10/2003
(Continued)

OTHER PUBLICATIONS

Communication dated Mar. 6, 2023 from the Japanese Patent Office in Application No. 2019-219276.

*Primary Examiner* — Joshua L Allen
*Assistant Examiner* — Vivian A Tran
(74) *Attorney, Agent, or Firm* — Sughrue Mion, PLLC (57) ABSTRACT

A sensor element (10) including: a measurement chamber (150); a pump cell (110) including a solid electrolyte (111), an inner electrode (113) exposed to the measurement chamber, and an outer electrode (112), the pump cell being configured to adjust an oxygen concentration in the measurement chamber; a diffusion resistance portion (151); and a detection cell (120) configured to measure a concentration of a specific gas in the measurement target gas after the adjustment of the oxygen concentration. The outer electrode is covered by a porous layer (114) and is disposed in a hollow space (10G) surrounded by a gas non-permeable dense layer 115, 118. The hollow space is in communication with an air introduction hole (10h) that is open on a rear side relative to the diffusion resistance portion. The outer electrode is exposed via the porous layer to air introduced through the air introduction hole.

6 Claims, 9 Drawing Sheets

(51) Int. Cl.
*G01N 27/406* (2006.01)
*G01N 27/407* (2006.01)
*G01M 15/10* (2006.01)

(52) U.S. Cl.
CPC ......... *G01N 27/4072* (2013.01); *G01N 27/41* (2013.01); *G01M 15/102* (2013.01)

(56) References Cited

U.S. PATENT DOCUMENTS

| | | | |
|---|---|---|---|
| 2003/0136677 A1* | 7/2003 | Neumann | G01N 27/4071 |
| | | | 204/426 |
| 2007/0119708 A1 | 5/2007 | Oya et al. | |
| 2013/0019655 A1* | 1/2013 | Nakagawa | G01N 27/419 |
| | | | 73/31.05 |
| 2015/0293051 A1* | 10/2015 | Kajiyama | G01N 27/4075 |
| | | | 204/424 |
| 2017/0315081 A1* | 11/2017 | Igarashi | G01N 27/4067 |

FOREIGN PATENT DOCUMENTS

| | | |
|---|---|---|
| JP | 2007-147383 A | 6/2007 |
| JP | 4966266 B2 | 7/2012 |
| JP | 2012-173146 A | 9/2012 |
| JP | 2013-040922 A | 2/2013 |
| JP | 2017-201305 A | 11/2017 |

* cited by examiner

SENSOR ELEMENT AND GAS SENSOR

TECHNICAL FIELD

The present invention relates to a sensor element and a gas sensor that include a pump cell and that are suitably used for detecting the concentration of a specific gas contained in combustion gas or exhaust gas from combustors, internal combustion engines, etc., for example.

BACKGROUND ART

Figure 9:
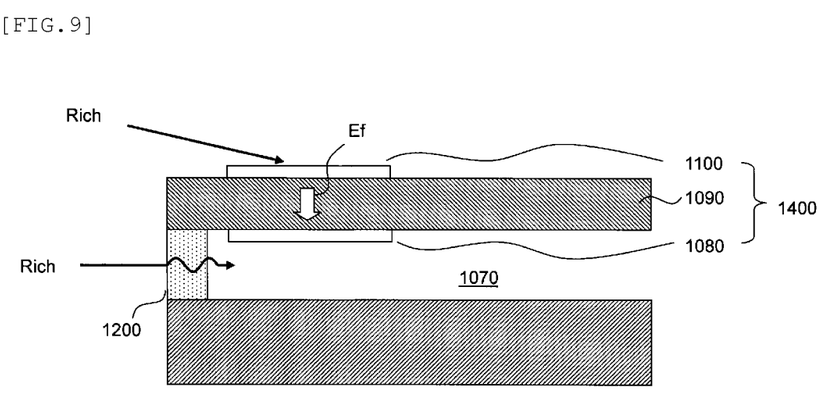
FIG. 9 Cross-sectional view of a sensor element including a conventional oxygen pump cell.

To date, a gas sensor for detecting the concentration of a specific component (oxygen, NOx, etc.) in exhaust gas from an internal combustion engine has been widely used (Patent Documents 1, 2). For example, a general NOx sensor has a sensor element including an oxygen pump cell 1400 as shown in FIG. 9. The oxygen pump cell 1400 has a pair of an inner electrode 1080 and an outer electrode 1100 formed on both surfaces of a solid electrolyte layer 1090. The inner electrode 1080 is exposed in a measurement chamber 1070 that is adjacent in a stacking direction to the solid electrolyte layer 1090. Meanwhile, the outer electrode 1100 faces the outside, and pumps out or pumps in oxygen in the exhaust gas to or from the outside. A voltage (Vp voltage) is applied to the oxygen pump cell 1400 such that the output voltage (electric motive force) corresponding to the oxygen concentration in the exhaust gas in the measurement chamber 1070 becomes constant, whereby the oxygen concentration in the measurement chamber 1070 is controlled to an extent that NOx is not decomposed.

PRIOR ART DOCUMENT

Patent Document

[Patent Document 1] Japanese Patent Application Laid-Open (kokai) No. 2012-173146
[Patent Document 2] Japanese Patent No. 4966266

SUMMARY OF THE INVENTION

Problems to be Solved by the Invention

However, in the case of the sensor element as shown in FIG. 9, there is a problem that when the oxygen atmosphere in the measurement target gas has changed, transient noise current flows in the oxygen pump cell 1400, causing difficulty in controlling the oxygen concentration in the measurement chamber 1070.

Figure 10:
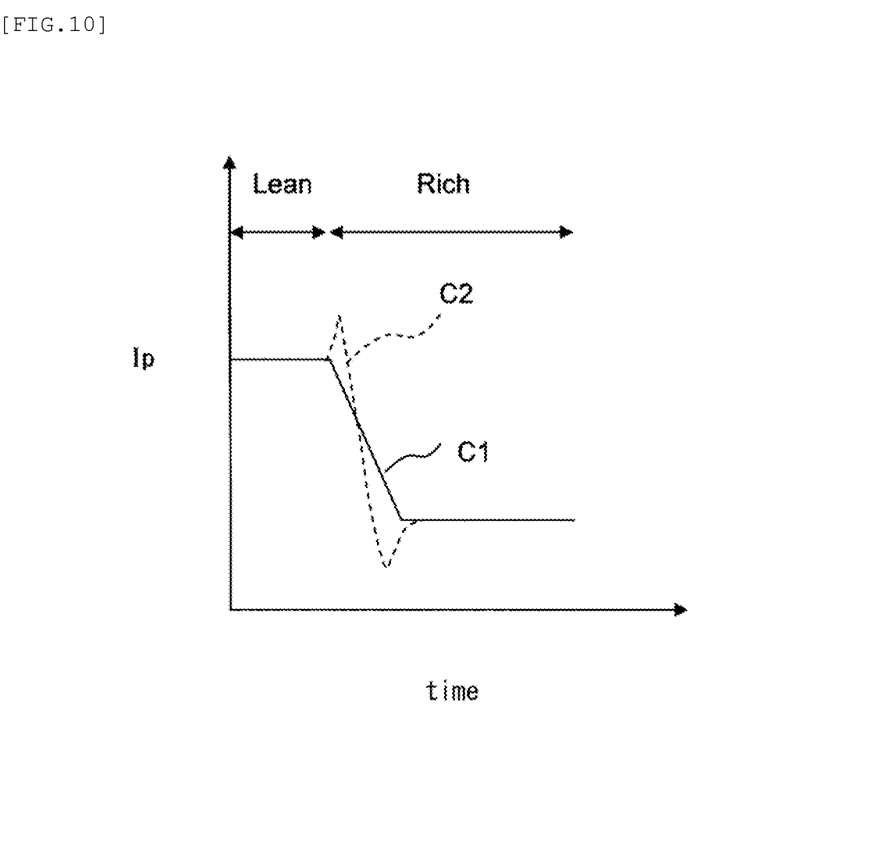
FIG. 10 Diagram showing a noise peak generated in an oxygen pump cell when an oxygen atmosphere in a measurement target gas has changed to rich side.

That is, when the oxygen atmosphere in the measurement target gas has changed to rich side, the oxygen concentration in the measurement chamber 1070 also becomes rich, and normally, pump current Ip that flows in the oxygen pump cell 1400 also decreases as indicated by the solid line C1 in FIG. 10.

However, as shown in FIG. 9, since the measurement target gas flows into the measurement chamber 1070 via a diffusion resistance portion 1200, it takes time before the measurement target gas comes into contact with the inner electrode 1080 in the measurement chamber 1070, and the atmosphere in the measurement chamber 1070 remains lean for some time. Meanwhile, since the outer electrode 1100 faces the outside, rich measurement target gas comes into contact with the outer electrode 1100 before the measurement target gas comes into contact with the inner electrode 1080. Thus, the inner electrode 1080 side in the measurement chamber 1070 becomes lean compared with the outer electrode 1100 side.

As a result, an electric motive force Ef as indicated by the arrow in FIG. 9 is generated in the oxygen pump cell 1400, whereby transient noise current flows, thus causing a noise peak as indicated by the broken line C2 in FIG. 10.

Thus, an object of the present invention is to provide a sensor element and a gas sensor in which: noise current in a pump cell caused when the oxygen atmosphere in the measurement target gas has changed is suppressed; and reduction in control accuracy of the oxygen concentration is suppressed.

Means for Solving the Problems

In order to solve the above problem, a sensor element of the present invention is a sensor element of a stacked type extending in a direction of an axial line thereof, and includes: a measurement chamber; a pump cell including a solid electrolyte, an inner electrode formed on a surface of the solid electrolyte and exposed to the measurement chamber, and an outer electrode formed on a surface of the solid electrolyte and disposed outside the measurement chamber, the pump cell being configured to adjust an oxygen concentration in the measurement chamber by pumping out and pumping in oxygen in a measurement target gas introduced into the measurement chamber; a diffusion resistance portion disposed between outside and the measurement chamber and configured to adjust a diffusion rate of the measurement target gas introduced into the measurement chamber; and a detection cell configured to measure a concentration of a specific gas in the measurement target gas after the adjustment of the oxygen concentration. The outer electrode is covered by a porous layer and is disposed in a hollow space surrounded by a dense layer that has a gas non-permeable property and that prevents the outer electrode from coming into contact with the measurement target gas. The hollow space is in communication with an air introduction hole that is open on a rear side relative to the diffusion resistance portion. The outer electrode is exposed via the porous layer to air introduced through the air introduction hole.

In this sensor element, the outer electrode is prevented from coming into contact with the measurement target gas by being disposed in the hollow space surrounded by the dense layer, and is exposed to air introduced through the air introduction hole on the rear side relative to the diffusion resistance portion.

Accordingly, the outer electrode always uses air as the reference atmosphere. Thus, even when the oxygen atmosphere in the measurement target gas has changed, the atmosphere at the outer electrode is maintained to be constant, noise current in the pump cell due to the change of the oxygen atmosphere in the measurement target gas is suppressed, and normal pump current flows that corresponds to the oxygen atmosphere in the measurement target gas introduced through the diffusion resistance portion into the measurement chamber. Accordingly, reduction in control accuracy of the oxygen concentration in the pump cell can be suppressed.

In addition, since the outer electrode is covered by the porous layer, the electrode material of the outer electrode having a noble metal (e.g. Pt) as a main material can be inhibited from sublimating during drive of the sensor.

In the sensor element of the present invention, when viewed in a stacking direction, a heater may be stacked on a side opposite to the dense layer.

In this sensor element, unlike the case where the heater is stacked on the dense layer side relative to the hollow space (for example, embedded in the dense layer), heat from the heater is not insulated by the hollow space. Thus, the heat from the heater can be more effectively used, and this configuration is also advantageous for rapid heating.

In the sensor element of the present invention, when viewed in a cross section along the stacking direction and perpendicular to the direction of the axial line, and when a cross-sectional area of the hollow space is defined as W1 and a cross-sectional area of the air introduction hole is defined as W2, a relationship of $(1.5 \times W1) \geq W2 \geq (0.3 \times W1)$ may be satisfied.

In this sensor element, it is possible to suppress reduction in the strength of the sensor element caused by making the cross-sectional area of the air introduction hole too large, and it is possible to suppress hindrance of introduction of air into the hollow space caused by making the cross-sectional area of the air introduction hole too small.

In the sensor element of the present invention, the air introduction hole may penetrate the dense layer and be open on a front side relative to a rear end of the sensor element.

In this sensor element, the length from the hollow space to the air introduction hole can be shortened, and air introduced through the air introduction hole is allowed to quickly come into contact with the outer electrode.

In the sensor element of the present invention, the outer electrode may contain a noble metal and a component of the solid electrolyte. When a cross section of the outer electrode is observed, the outer electrode may include a noble metal region composed of the noble metal, a solid electrolyte region composed of the component of the solid electrolyte, and a coexistence region in which the noble metal and the component of the solid electrolyte coexist. The coexistence region may be present along a boundary between the noble metal region and the solid electrolyte region.

In this sensor element, variation in electrode resistance of the outer electrode can be suppressed, and reduction in control accuracy of the oxygen concentration in the pump cell can be suppressed.

A gas sensor of the present invention includes: the sensor element and a metal shell configured to hold the sensor element.

Effects of the Invention

According to the present invention, it is possible to obtain a sensor element and a gas sensor in which: noise current in the pump cell caused when an oxygen atmosphere in a measurement target gas has changed is suppressed; and reduction in control accuracy of the oxygen concentration is suppressed.

MODES FOR CARRYING OUT THE INVENTION

Hereinafter, embodiments of the present invention will be described.

Figure 1:
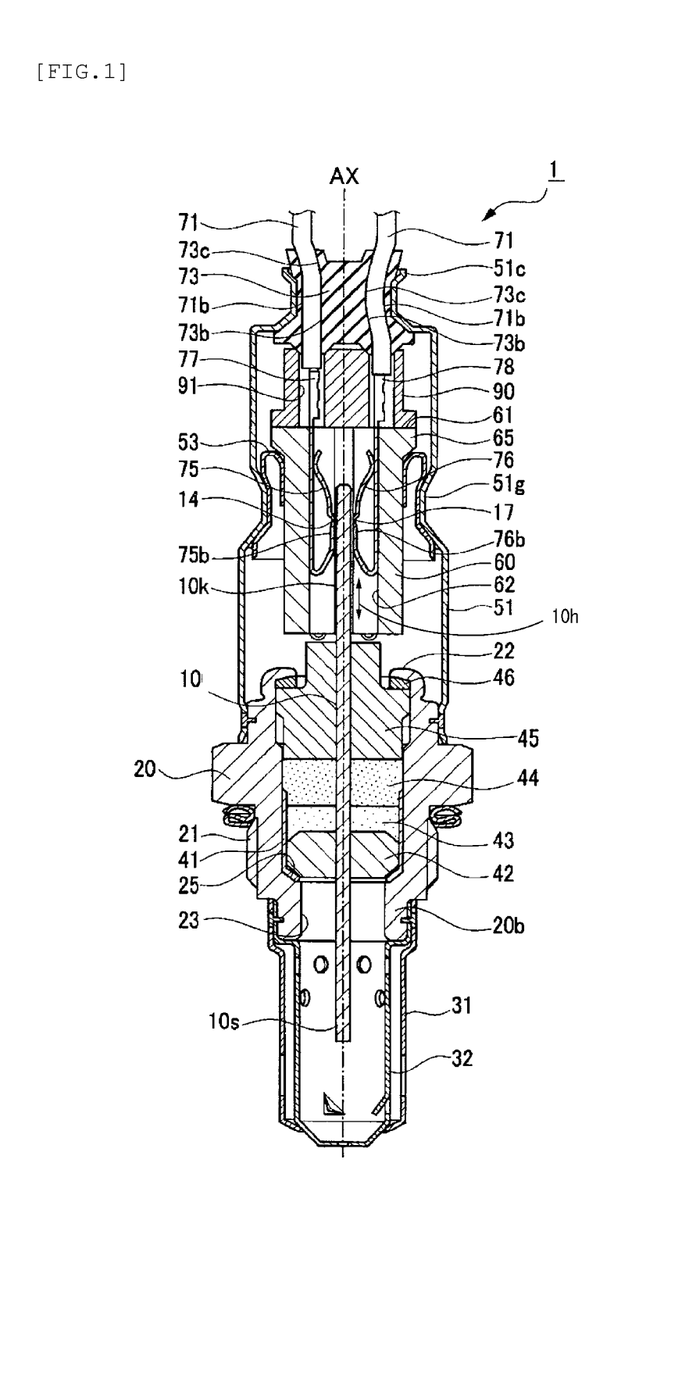
FIG. 1 Cross-sectional view along the longitudinal direction of a gas sensor (NOx sensor) according to a first embodiment of the present invention.
Figure 2:
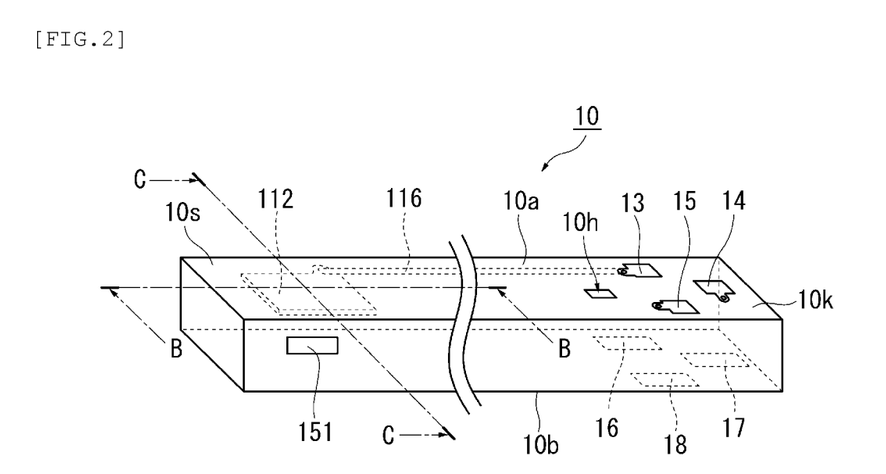
FIG. 2 Perspective view of a sensor element according to the first embodiment.
Figure 3:
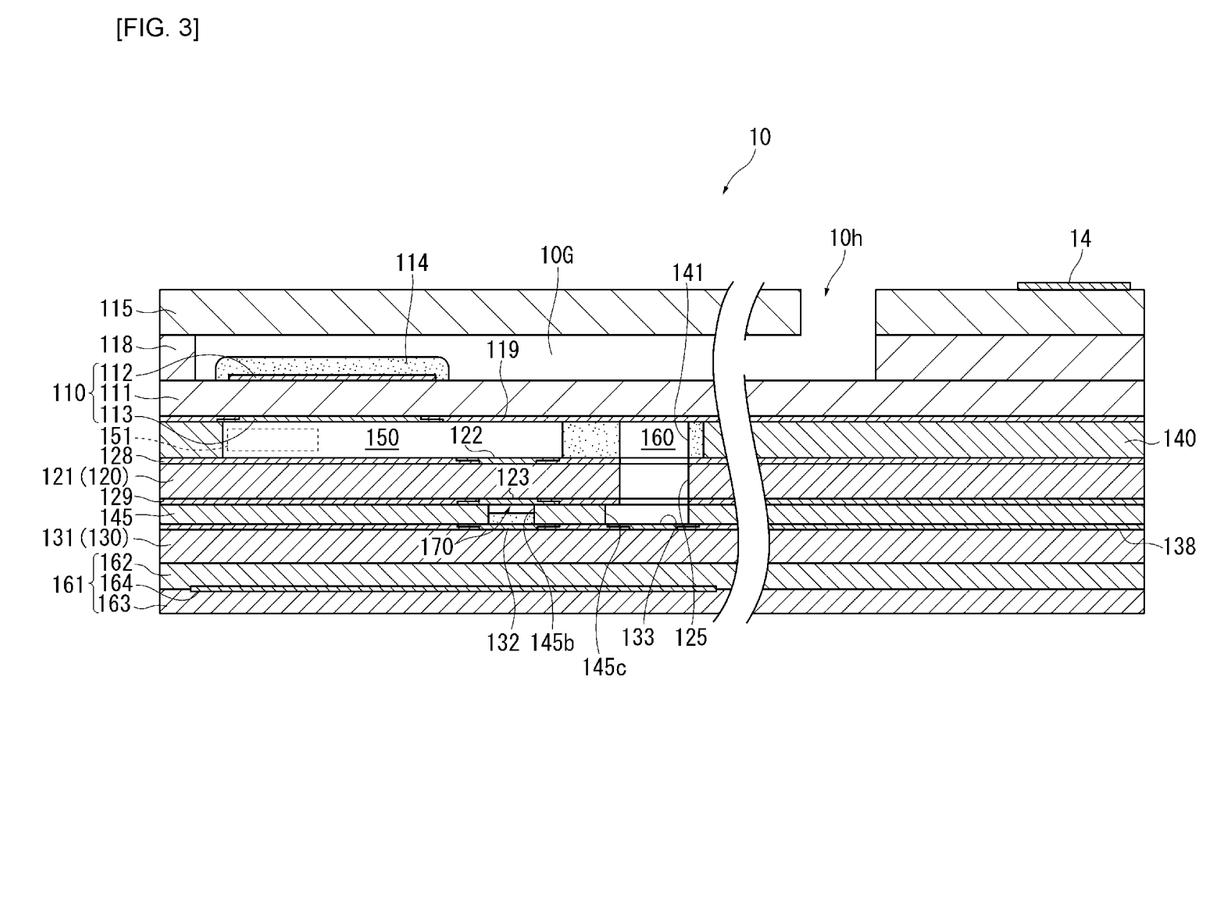
FIG. 3 Cross-sectional view along a line B-B in FIG. 2.
Figure 4:
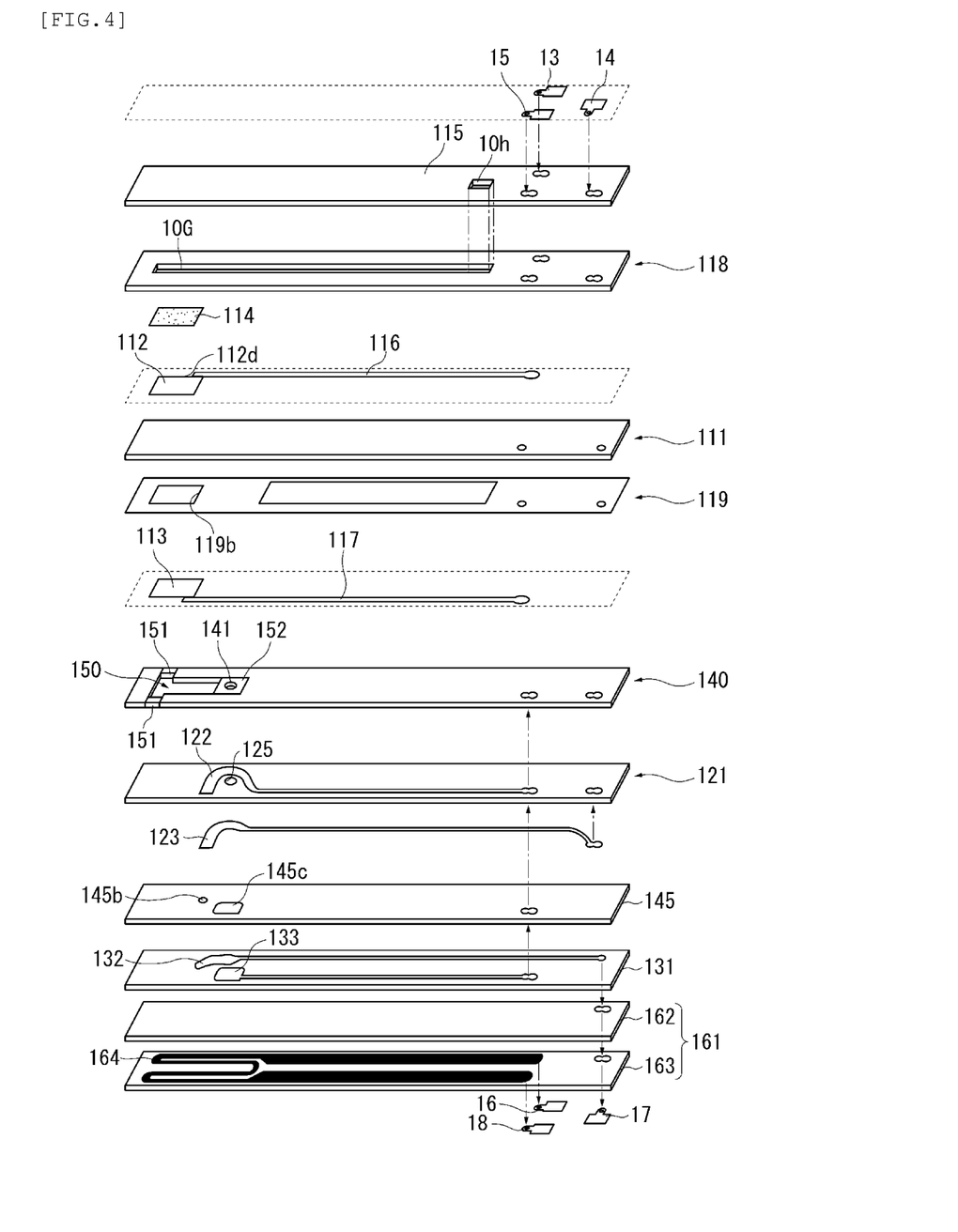
FIG. 4 Exploded perspective view of a vicinity of an Ip1 cell (pump cell) of the sensor element according to the first embodiment.
Figure 5:
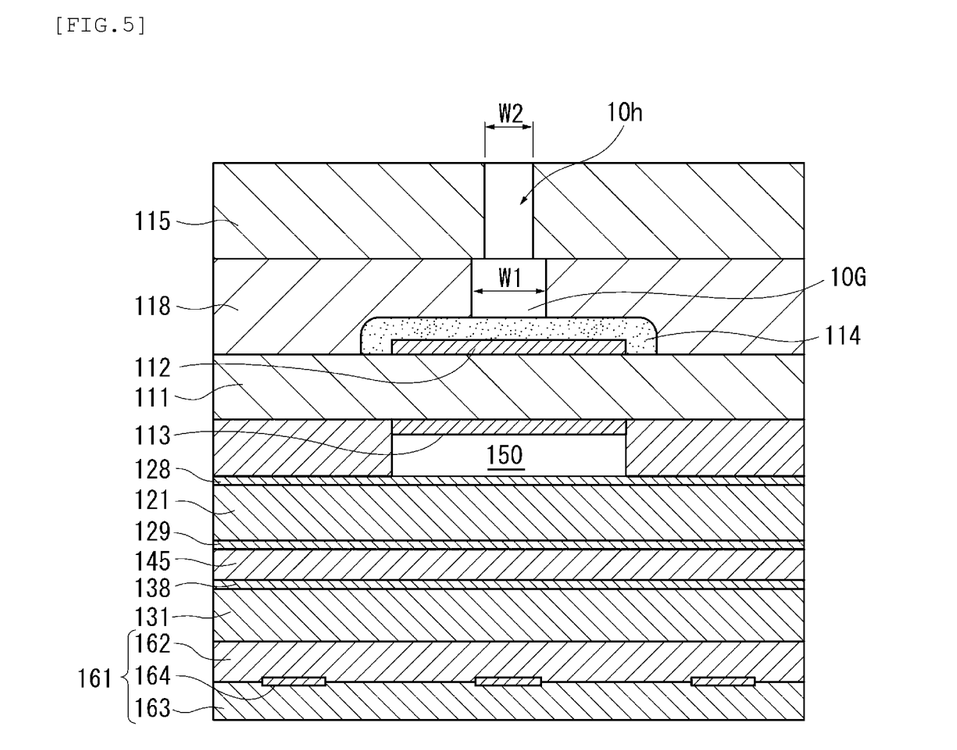
FIG. 5 Cross-sectional view along a line C-C in FIG. 2.

FIG. 1 is a longitudinal cross-sectional view (cross-sectional view in a longitudinal direction along an axial line AX) of a gas sensor (NOx sensor) 1 according to a first embodiment of the present invention. FIG. 2 is a perspective view of a sensor element 10 according to the first embodiment. FIG. 3 is a cross-sectional view along a line B-B (axial line AX) in FIG. 2. FIG. 4 is an exploded perspective view of a vicinity of an Ip1 cell (pump cell) 110 of the sensor element 10. FIG. 5 is a cross-sectional view along a line C-C (line orthogonal to the axial line AX) in FIG. 2.

In order to distinguish from "width direction" of the sensor element, the direction along the axial line AX (the direction of the axial line) is referred to as "longitudinal direction" as appropriate. The "width direction" of the sensor element is a direction perpendicular to the "longitudinal direction (the direction of the axial line)".

The gas sensor 1 is a NOx sensor that includes the sensor element 10 capable of detecting the concentration of a specific gas (NOx) in exhaust gas as a gas to be measured, and that is mounted, for use, to an exhaust pipe (not shown) of an internal combustion engine. The gas sensor 1 includes a tubular metal shell 20 which has a screw portion 21, for fixation to an exhaust pipe, formed at a predetermined position on the outer surface of the metal shell 20. The sensor element 10 has an elongated plate shape extending in the direction of the axial line AX, and is held inside the metal shell 20.

More specifically, the gas sensor 1 includes: a holding member 60 having an insertion hole 62 into which a rear end portion 10k (upper end portion in FIG. 1) of the sensor element 10 is inserted; and six terminal members held inside the holding member 60. In FIG. 1, only two terminal members (specifically, terminal members 75, 76) among the six terminal members are shown.

A total of six electrode terminal portions 13 to 18 (only electrode terminal portions 14, 17 are shown in FIG. 1) each having a rectangular shape in a plan view are formed in the rear end portion 10k of the sensor element 10. The above-described terminal members are elastically in contact with and electrically connected to the electrode terminal portions 13 to 18. For example, an element contact potion 75b of the terminal member 75 is elastically in contact with and electrically connected to the electrode terminal portion 14. An element contact potion 76b of the terminal member 76 is elastically in contact with and electrically connected to the electrode terminal portion 17.

Further, different lead wires 71 are electrically connected to the six terminal members (terminal member 75, 76, etc.), respectively. For example, as shown in FIG. 1, the core wire of the lead wire 71 is crimped and gripped by a lead wire gripping portion 77 of the terminal member 75. Moreover, the core wire of another lead wire 71 is crimped and gripped by a lead wire gripping portion 78 of the terminal member 76.

On one of main surfaces of the rear end portion 10k of the sensor element 10, an air introduction hole 10h is open (see FIG. 2) on the front side relative to the electrode terminal portions 13 to 15, and on the rear side relative to a ceramic sleeve 45 described later. The air introduction hole 10h is disposed in the insertion hole 62 of the holding member 60.

Accordingly, reference air entrapped inside an outer casing 51 described later is introduced through the air introduction hole 10h into the inside of the sensor element 10.

The metal shell 20 is a tubular member having a through hole 23 penetrating the metal shell 20 in the direction of the axial line AX. The metal shell 20 has a ledge portion 25 forming a part of the through hole 23 while projecting toward the radially inner side. The metal shell 20 holds the sensor element 10 in the through hole 23 in a state where a front end portion 10s of the sensor element 10 projects to the outside (lower side in FIG. 1) relative to the front side of the metal shell 20 and the rear end portion 10k of the sensor element 10 projects to the outside (upper side in FIG. 1) relative to the rear side of the metal shell 20.

An annular ceramic holder 42, two talc rings 43, 44 each obtained by filling talc powder in a annular shape, and the ceramic sleeve 45 are disposed in the through hole 23 of the metal shell 20. Specifically, in a state of surrounding the periphery of the sensor element 10, the ceramic holder 42, the talc rings 43, 44, and the ceramic sleeve 45 are stacked in this order from the front side (lower end side in FIG. 1) in the direction of the axial line of the metal shell 20 toward the rear side (upper end side in FIG. 1) in the direction of the axial line.

A metal cup 41 is disposed between the ceramic holder 42 and the ledge portion 25 of the metal shell 20. A crimp ring 46 is disposed between the ceramic sleeve 45 and a crimp portion 22 of the metal shell 20. The crimp portion 22 of the metal shell 20 is crimped so as to press the ceramic sleeve 45 via the crimp ring 46 toward the front side.

An external protector 31 and an internal protector 32 each made of metal (specifically, stainless steel) and having a plurality of holes are attached by welding to a front end portion 20b of the metal shell 20 so as to cover the front end portion 10s of the sensor element 10. Meanwhile, the outer casing 51 is attached by welding to a rear end portion of the metal shell 20. The outer casing 51 has a tubular shape extending in the direction of the axial line AX, and surrounds the sensor element 10.

The holding member 60 is formed from an insulating material (specifically, alumina), and is a tubular member having the insertion hole 62 penetrating the holding member 60 in the direction of the axial line AX. The above-described six terminal members (terminal members 75, 76, etc.) are disposed in the insertion hole 62 (see FIG. 1). A flange portion 65 projecting toward the radially outer side is formed in a rear end portion of the holding member 60. The holding member 60 is held by an internal support member 53 such that the flange portion 65 is in contact with the internal support member 53. The internal support member 53 is held by the outer casing 51 by means of a crimp portion 51g obtained by crimping a portion of the outer casing 51 toward the radially inner side.

An insulating member 90 is disposed on a rear end surface 61 of the holding member 60. The insulating member 90 is formed from an electrical insulating material (specifically, alumina), and has a cylindrical shape. A total of six through holes 91 penetrating in the direction of the axial line AX are formed in the insulating member 90. The lead wire gripping portions (lead wire gripping portions 77, 78, etc.) of the terminal members described above are disposed in the through holes 91.

An elastic seal member 73 formed from fluorocarbon rubber is disposed on the radially inner side of a rear end opening portion 51c positioned at a rear end portion (upper end portion in FIG. 1) in the direction of the axial line of the outer casing 51. A total of six insertion holes 73c each extending in the direction of the axial line AX and having a cylindrical shape are formed in the elastic seal member 73. The respective insertion holes 73c are formed by insertion hole surfaces 73b (cylindrical inner wall surfaces) of the elastic seal member 73. One lead wire 71 is inserted in each insertion hole 73c. Each lead wire 71 extends to the outside of the gas sensor 1 through the insertion hole 73c of the elastic seal member 73. The elastic seal member 73 is elastically and compressively deformed in the radial direction as a result of the rear end opening portion 51c of the outer casing 51 being crimped toward the radially inner side. Accordingly, each insertion hole surface 73b and an outer periphery 71b of a corresponding lead wire 71 are brought into close contact with each other, whereby the insertion hole surface 73b and the outer periphery 71b of the lead wire 71 are sealed in a watertight manner.

Meanwhile, as shown in FIG. 3, the sensor element 10 includes solid electrolytes 111, 121, 131 each having a plate shape, and insulators 140, 145 disposed between the solid electrolytes 111, 121, 131. The sensor element 10 is structured such that these are stacked in a stacking direction. Moreover, in the sensor element 10, a heater 161 is stacked on the lower surface side of the solid electrolyte 131. The heater 161 includes: insulators 162, 163 each having a plate shape and formed from alumina as a main material; and a heater pattern 164 (formed from Pt as a main material) embedded therebetween.

The solid electrolytes 111, 121, 131 are formed from zirconia, which is a solid electrolyte, and have oxygen ion conductivity. A porous Ip1+electrode 112 is provided on the upper surface side of the solid electrolyte 111. A porous Ip1−electrode 113 is provided on the lower surface side of the solid electrolyte 111. Further, the surface of the Ip1+ electrode 112 is covered by a porous layer 114.

An Ip1+lead 116 is connected to the Ip1+electrode 112 (see FIG. 2, FIG. 4). An Ip1−lead 117 (FIG. 4) is connected to the Ip1−electrode 113.

As shown in FIG. 4, a gas non-permeable first dense layer 118 formed from alumina and the like and having a hollow space 10G therein is stacked on the upper surfaces of the Ip1+electrode 112 and the Ip1+lead 116. The porous layer 114 is exposed from the hollow space 10G, and the Ip1+lead 116 is covered by a frame portion on the outer periphery side of the first dense layer 118.

The hollow space 10G extends straight from the vicinity of the porous layer 114 to a position at which the hollow space 10G is in communication with the air introduction hole 10h. The first dense layer 118 on the rear side of the hollow space 10G is provided with through holes for providing electrical connection to the electrode terminal portions 13 to 15.

Further, a gas non-permeable second dense layer 115 formed from alumina and the like is stacked on the upper surface of the first dense layer 118, and closes the hollow space 10G. Accordingly, the Ip1+electrode 112 covered by the porous layer 114 is disposed in the hollow space 10G surrounded by the dense layers 115, 118, whereby the Ip1+electrode 112 is prevented from coming into contact with the measurement target gas.

A portion, of the second dense layer 115, that overlaps a rear end portion of the hollow space 10G is open in a rectangular shape, to form the air introduction hole 10h, whereby the hollow space 10G is in communication with the air introduction hole 10h. The air introduction hole 10h is open on the rear side relative to a first porous body 151 described later, and can introduce air, not the exhaust gas. Accordingly, the Ip1+electrode 112 is exposed via the porous layer 114 to the air introduced through the air introduction hole 10h.

Here, the solid electrolyte 111, the Ip1−electrode 113, and the Ip1+electrode 112 respectively correspond to "solid electrolyte", "inner electrode", and "outer electrode" in the claims. A first measurement chamber 150 described later corresponds to "measurement chamber" in the claims.

The solid electrolyte 111 and the electrodes 112, 113 form an Ip1 cell 110 (pump cell). In accordance with pump current Ip1 caused to flow between the electrodes 112 and 113, the Ip1 cell 110 pumps out and pumps in oxygen (so-called oxygen pumping) between the atmosphere (air, in the hollow space 10G, which is different from the measurement target gas outside the sensor element 10) that is in contact with the electrode 112, and the atmosphere (the atmosphere in the first measurement chamber 150 described later, i.e., the measurement target gas outside the sensor element 10) that is in contact with the electrode 113.

The solid electrolyte 121 is disposed so as to be opposed in the stacking direction to the solid electrolyte 111, with the insulator 140 therebetween. A porous Vs-electrode 122 is provided on the upper surface side (upper surface side in FIG. 2) of the solid electrolyte 121. A porous Vs+electrode 123 is provided on the lower surface side (lower surface side in FIG. 2) of the solid electrolyte 121.

The first measurement chamber 150 as an internal space of the sensor element 10 is formed between the solid electrolyte 111 and the solid electrolyte 121. The first measurement chamber 150 is an internal space into which the measurement target gas (exhaust gas) flowing in an exhaust passage is first introduced into the sensor element 10. The first measurement chamber 150 is in communication with the outside of the sensor element 10 through a first porous body (diffusion resistance portion) 151 (see FIG. 2 and FIG. 4) having gas permeability and water permeability. The first porous body 151 is provided on the lateral sides of the first measurement chamber 150 so as to serve as partitions with respect to the outside of the sensor element 10, and restricts the flow amount per unit time (diffusion rate) of the exhaust gas into the first measurement chamber 150.

On the rear side (right side in FIG. 2) of the first measurement chamber 150, a second porous body 152 that restricts the flow amount per unit time of the exhaust gas is provided as a partition between the first measurement chamber 150 and a second measurement chamber 160 described later.

The solid electrolyte 121 and the electrodes 122, 123 form a Vs cell (detection cell) 120. The Vs cell 120 generates an electric motive force in accordance with an oxygen partial pressure difference mainly between the atmospheres (the atmosphere in the first measurement chamber 150 in contact with the electrode 122, and the atmosphere in a reference oxygen chamber 170 in contact with the electrode 123) separated by the solid electrolyte 121.

The solid electrolyte 131 is disposed so as to be opposed in the stacking direction to the solid electrolyte 121, with the insulator 145 therebetween. A porous Ip2+electrode 132 and a porous Ip2-electrode 133 are provided on the upper surface side (upper surface side in FIG. 2) of the solid electrolyte 131.

The reference oxygen chamber 170 as an isolated small space is formed between the Ip2+electrode 132 and the Vs+electrode 123. The reference oxygen chamber 170 is formed by an opening 145b formed in the insulator 145. A ceramic porous body is disposed on the Ip2+electrode 132 side in the reference oxygen chamber 170.

The second measurement chamber 160 as an internal space of the sensor element 10 is formed at a position opposed in the stacking direction to the Ip2-electrode 133. The second measurement chamber 160 is formed by an opening 145c penetrating the insulator 145 in the stacking direction, an opening 125 penetrating the solid electrolyte 121 in the stacking direction, and an opening 141 penetrating the insulator 140 in the stacking direction.

The first measurement chamber 150 and the second measurement chamber 160 are in communication with each other through the second porous body 152 having gas permeability and water permeability. Therefore, the second measurement chamber 160 is in communication with the outside of the sensor element 10 through the first porous body 151, the first measurement chamber 150, and the second porous body 152.

The solid electrolyte 131 and the electrodes 132, 133 form an Ip2 cell 130 (second pump cell) for detecting the NOx concentration. The Ip2 cell 130 moves oxygen (oxygen ions) derived from NOx decomposed in the second measurement chamber 160, to the reference oxygen chamber 170 through the solid electrolyte 131. At this time, current corresponding to the concentration of NOx contained in the exhaust gas (gas to be measured) introduced in the second measurement chamber 160 flows between the electrode 132 and the electrode 133.

In the present embodiment, an alumina insulating layer 119 is formed in a portion, excluding the Ip1−electrode 113, on the lower surface of the solid electrolyte 111. The Ip1−electrode 113 is in contact with the solid electrolyte 111 through a through hole 119b (see FIG. 4) penetrating the alumina insulating layer 119 in the stacking direction.

Further, in the present embodiment, an alumina insulating layer 128 is formed in a portion, excluding the Vs-electrode 122, on the upper surface of the solid electrolyte 121. The Vs-electrode 122 is in contact with the solid electrolyte 121 through a through hole (not shown) penetrating the alumina insulating layer 128 in the stacking direction.

Further, an alumina insulating layer 129 is formed in a portion, excluding the Vs+electrode 123, on the lower surface of the solid electrolyte 121. The Vs+electrode 123 is in contact with the solid electrolyte 121 through a through hole (not shown) penetrating the alumina insulating layer 129 in the stacking direction.

Further, in the present embodiment, an alumina insulating layer 138 is formed in a portion, excluding the Ip2+electrode 132, on the upper surface of the solid electrolyte 131. The Ip2+electrode 132 is in contact with the solid electrolyte 131 through a through hole (not shown) penetrating the alumina insulating layer 138 in the stacking direction. Further, the alumina insulating layer 138 is formed also in a portion, excluding the Ip2-electrode 133, on the upper surface of the solid electrolyte 131. The electrode 133 is in contact with the solid electrolyte 131 through a through hole (not shown) penetrating the alumina insulating layer 138 in the stacking direction.

Here, the detection of the NOx concentration performed by the gas sensor 1 of the present embodiment is briefly described.

The solid electrolytes 111, 121, 131 of the sensor element 10 are heated in association with increase in the temperature of the heater pattern 164 and are activated. Accordingly, the Ip1 cell 110, the Vs cell 120, and the Ip2 cell 130 operate.

The exhaust gas flowing in the exhaust passage (not shown) is introduced into the first measurement chamber 150 with the flow amount thereof being restricted by the first porous body 151. At this time, in the Vs cell 120, weak current Icp is being flowed from the electrode 123 side toward the electrode 122 side. Thus, oxygen in the exhaust gas can receive electrons from the electrode 122 in the first measurement chamber 150 serving as the negative electrode side, flows in the form of oxygen ions in the solid electrolyte 121, and moves into the reference oxygen chamber 170. That is, as a result of the current Icp flowing between the electrodes 122 and 123, oxygen in the first measurement chamber 150 is sent into the reference oxygen chamber 170.

When the oxygen concentration of the exhaust gas introduced into the first measurement chamber 150 is lower than a predetermined value, current Ip1 is caused to flow in the Ip1 cell 110 such that the electrode 112 serves as the negative electrode, whereby oxygen is pumped into the first measurement chamber 150 from outside the sensor element 10. Meanwhile, when the oxygen concentration of the exhaust gas introduced into the first measurement chamber 150 is greater than a predetermined value, current Ip1 is caused to flow in the Ip1 cell 110 such that the electrode 113 serves as the negative electrode, whereby oxygen is pumped out from the first measurement chamber 150 to the outside of the sensor element 10.

In this manner, the exhaust gas of which the oxygen concentration has been adjusted in the first measurement chamber 150 is introduced into the second measurement chamber 160 through the second porous body 152. NOx in the exhaust gas having come into contact with the electrode 133 in the second measurement chamber 160 is decomposed (reduced) into nitrogen and oxygen on the electrode 133 when voltage Vp2 is applied between the electrodes 132 and 133. The decomposed oxygen flows in the form of oxygen ions in the solid electrolyte 131, and moves into the reference oxygen chamber 170. At this time, remaining oxygen that has not been pumped out in the first measurement chamber 150 similarly moves into the reference oxygen chamber 170 through the Ip2 cell 130. Accordingly, current derived from NOx and current derived from the remaining oxygen flow in the Ip2 cell 130. The oxygen having moved into the reference oxygen chamber 170 is released to the outside (air) via the Vs+electrode 123 and a Vs lead and the Ip2+electrode 132 and an Ip2+lead which are in contact with the inside of the reference oxygen chamber 170. Therefore, the Vs+lead and the Ip2+lead are configured to be porous.

Here, the concentration of the remaining oxygen which has not been pumped out in the first measurement chamber 150 is adjusted to a predetermined value as described above. Therefore, the current derived from the remaining oxygen can be considered to be substantially constant, and thus, is less likely to have influence on change of the current derived from NOx. Accordingly, the current flowing in the Ip2 cell 130 becomes proportional to the NOx concentration. Therefore, if current Ip2 flowing in the Ip2 cell 130 is detected, the NOx concentration in the exhaust gas can be detected on the basis of the current value.

In the present embodiment, the Ip1+electrode 112 is prevented from coming into contact with the measurement target gas by being disposed in the hollow space 10G surrounded by the dense layers 115, 118, and is exposed to air introduced through the air introduction hole 10h.

Accordingly, the Ip1+electrode 112 always uses air as the reference atmosphere. Thus, even when the oxygen atmosphere in the measurement target gas has changed, the atmosphere at the Ip1+electrode 112 is maintained to be constant, noise current (broken line C2 in FIG. 10) in the pump cell due to the change of the oxygen atmosphere in the measurement target gas is suppressed, and normal pump current (solid line C1 in FIG. 10) flows that corresponds to the oxygen atmosphere in the measurement target gas introduced through the first porous body 151 into the first measurement chamber 150. Therefore, reduction in control accuracy of the oxygen concentration in the pump cell can be suppressed.

In addition, since the Ip1+electrode 112 is covered by the porous layer 114, the electrode material of the Ip1+electrode 112 having a noble metal (e.g. Pt) as a main material is inhibited from sublimating during drive of the sensor.

In the present embodiment, when viewed in the stacking direction, the heater 161 is stacked on the side (the pump cell 110 side relative to the hollow space 10G) opposite to the dense layers 115, 118.

Accordingly, unlike the case where the heater 161 is stacked on the dense layers 115, 118 side relative to the hollow space 10G (for example, embedded in the dense layer 115), heat from the heater 161 is not insulated by the hollow space 10G. Thus, the heat from the heater 161 can be more effectively used, and this configuration is also advantageous for rapid heating.

In the present embodiment, the air introduction hole 10h penetrates the dense layers 115, 118 and is open on the front side relative to the rear end of the sensor element 10.

Accordingly, the length from the hollow space 10G to the air introduction hole 10h can be shortened, and air introduced through the air introduction hole 10h is allowed to quickly come into contact with the Ip1+electrode 112.

In the present embodiment, the Ip1+electrode 112 contains a noble metal and a component of the solid electrolyte 111. When a cross section of the Ip1+electrode 112 is observed, the Ip1+electrode 112 includes a noble metal region composed of the noble metal, a solid electrolyte region composed of the component of the solid electrolyte 111, and a coexistence region in which the noble metal and the component of the solid electrolyte 111 coexist. The coexistence region is present along the boundary between the noble metal region and the solid electrolyte region.

Accordingly, variation in electrode resistance of the Ip1+electrode 112 can be suppressed, and reduction in control accuracy of the oxygen concentration in the pump cell can be suppressed.

In the present embodiment, as shown in FIG. 5 indicating the air introduction hole 10h, when the cross-sectional area of the hollow space 10G is defined as W1, and the cross-sectional area of the air introduction hole 10h is defined as W2, a relationship of $(1.5 \times W1) \geq W2 \geq (0.3 \times W1)$ is satisfied.

Accordingly, it is possible to suppress reduction in the strength of the sensor element 10 caused by making the cross-sectional area of the air introduction hole 10h too large, and it is possible to suppress hindrance of introduction of air into the hollow space 10G caused by making the cross-sectional area of the air introduction hole 10h too small.

Figure 6:
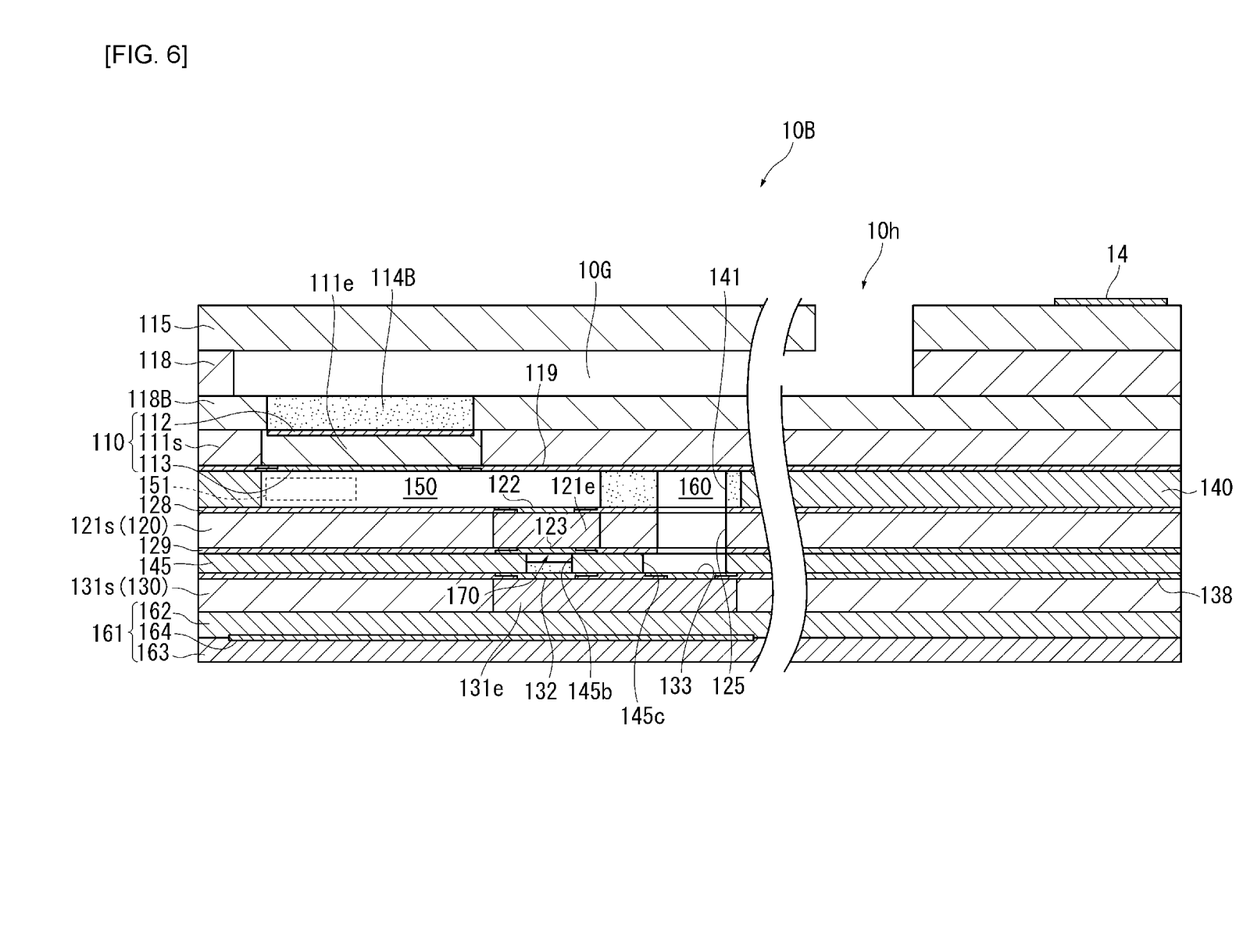
FIG. 6 Cross-sectional view along the axial line of a sensor element according to a second embodiment.
Figure 7:
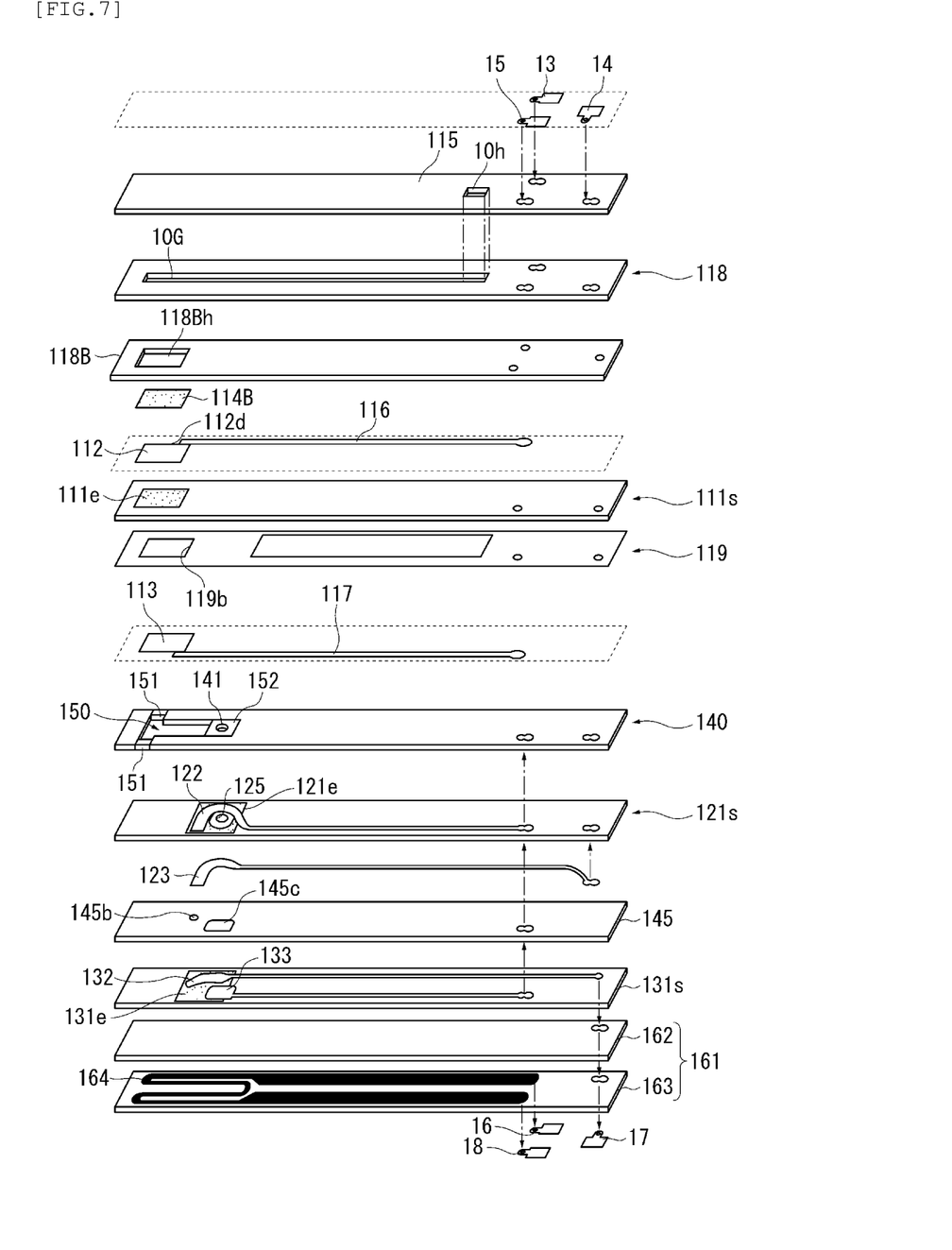
FIG. 7 Exploded perspective view of a vicinity of an Ip1 cell (pump cell) of the sensor element according to the second embodiment.

Next, with reference to FIG. 6 and FIG. 7, a sensor element 10B according to a second embodiment of the present invention is described. The sensor element 10B according to the second embodiment are the same as the sensor element 10 according to the first embodiment except that: a third dense layer 118B is provided between the first dense layer 118 and a composite layer including a solid electrolyte 111e (specifically, the solid electrolyte 111e and an insulating layer 111s described later); and solid electrolytes 111e, 121e, 131e are respectively embedded in insulating layer 111s, 121s, 131s. Thus, the configurations of the same components are not described.

FIG. 6 is a cross-sectional view along the axial line AX of the sensor element 10B according to the second embodiment. FIG. 7 is an exploded perspective view of a vicinity of the Ip1 cell (pump cell) 110 of the sensor element 10B.

In the second embodiment, as shown in FIG. 6 and FIG. 7, the third dense layer 118B is provided between the first dense layer 118 and the composite layer. A rectangular opening 118Bh is provided on the front side of the third dense layer 118B.

A porous layer 114B is filled in the opening 118Bh. The Ip1+electrode 112 is formed on the lower surface (the Ip1+electrode 112 side) of the porous layer 114B, and the Ip1+electrode 112 projects toward the lower side relative to the lower surface of the third dense layer 118B. The above-described projecting portion of the Ip1+electrode 112 is covered by the solid electrolyte 111e.

Thus, in the second embodiment, the side surfaces of the Ip1+electrode 112 are surrounded by the solid electrolyte 111e.

The solid electrolytes 111e, 121e, 131e each have a substantially rectangular shape, and a rectangular opening is provided on the front side of each of the insulating layers 111s, 121s, 131s. The solid electrolytes 111e, 121e, 131e are embedded in the respective openings.

Also in the second embodiment, the Ip1+electrode 112 is prevented from coming into contact with the measurement target gas by being disposed in the hollow space 10G and surrounded by the solid electrolyte 111e, and is exposed to air introduced through the air introduction hole 10h.

Accordingly, the Ip1+electrode 112 always uses air as the reference atmosphere. Thus, even when the oxygen atmosphere in the measurement target gas has changed, the atmosphere at the Ip1+electrode 112 is maintained to be constant, noise current in the pump cell is suppressed, and reduction in control accuracy of the oxygen concentration in the pump cell can be suppressed.

Since the Ip1+electrode 112 is covered by the porous layer 114B, sublimation of the Ip1+electrode 112 can be inhibited.

Figure 8:
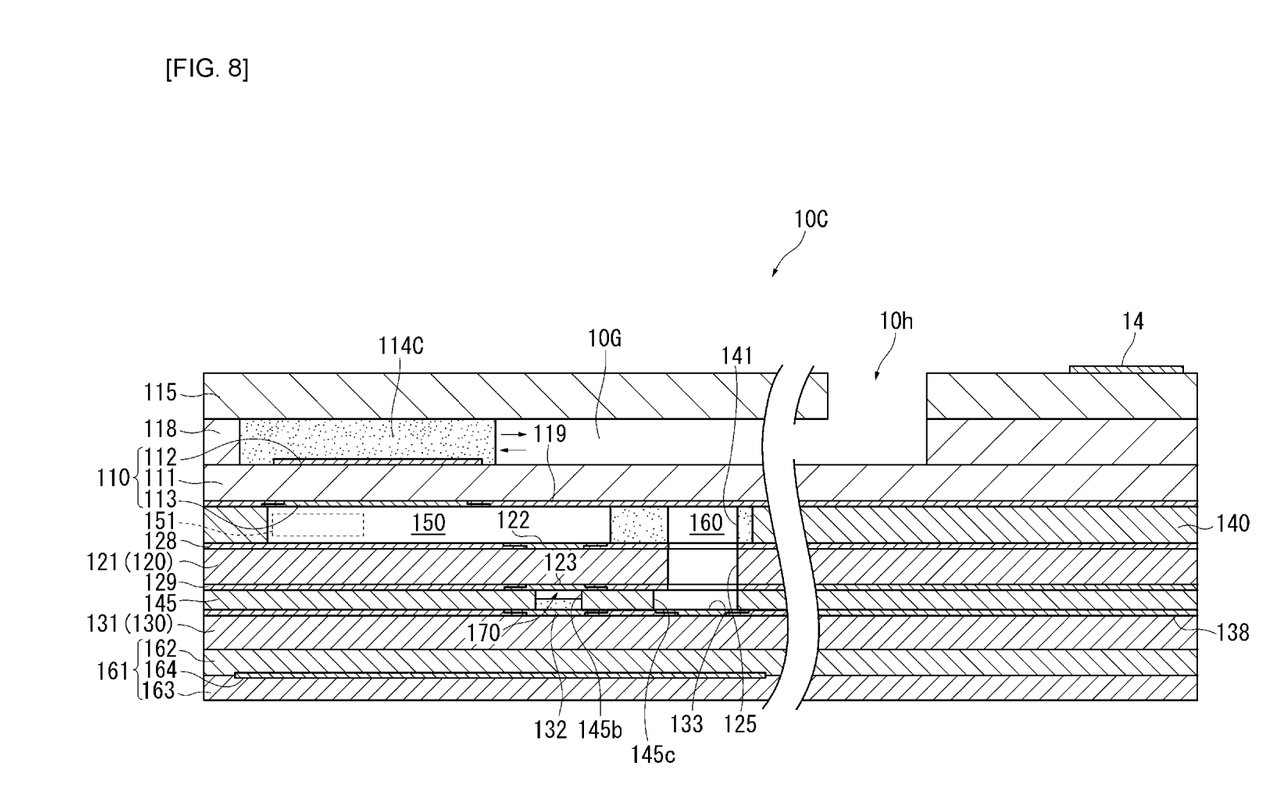
FIG. 8 Cross-sectional view along the axial line of a sensor element according to a third embodiment.

Next, with reference to FIG. 8, a sensor element 10C according to a third embodiment of the present invention is described. The sensor element 10C according to the third embodiment is the same as the sensor element 10 according to the first embodiment except that a porous layer 114C is formed so as to have the same thickness as that of the first dense layer 118. Thus, the configurations of the same components are not described.

FIG. 8 is a cross-sectional view along the axial line AX of the sensor element 10C according to the third embodiment.

In the third embodiment, as shown in FIG. 8, the porous layer 114C is formed so as to have the same thickness as that of the first dense layer 118.

Thus, in the third embodiment, as for the porous layer 114C covering the Ip1+electrode 112, only the side surface on the rear side of the porous layer 114C faces the hollow space 10G and is exposed to air (arrow in FIG. 8).

Also in the third embodiment, the Ip1+electrode 112 is prevented from coming into contact with the measurement target gas by being disposed in the hollow space 10G surrounded by the dense layers 115, 118, and is exposed to air introduced through the air introduction hole 10h.

Accordingly, the Ip1+electrode 112 always uses air as the reference atmosphere. Thus, even when the oxygen atmosphere in the measurement target gas has changed, the atmosphere at the Ip1+electrode 112 is maintained to be constant, noise current in the pump cell is suppressed, and reduction in control accuracy of the oxygen concentration in the pump cell can be suppressed.

Since the Ip1+electrode 112 is covered by the porous layer 114C, sublimation of the Ip1+electrode 112 can be inhibited.

It is needless to say that the present invention is not limited to the above embodiments and includes various modifications and equivalents encompassed in the idea and the scope of the present invention.

The hollow space 10G may penetrate up to the rear end of the sensor element and the air introduction hole may be open at the rear end surface of the sensor element.

The position of the diffusion resistance portion (first porous body 151) is not limited to the side surfaces of the sensor element, and may be disposed at the front end surface of the sensor element.

Each solid electrolyte 111, 121, 131 may be embedded in an insulating layer.

The present invention is applicable to a sensor element (gas sensor) having an oxygen pump cell and a detection cell (two or more cells), and is applicable to the NOx sensor element (NOx sensor) of the present embodiment. However, it is needless to say that the present invention is applicable to, not limited to these applications, various modifications and equivalents encompassed in the idea and the scope of the present invention. For example, the present invention may be applied to an oxygen sensor (oxygen sensor element) for detecting the oxygen concentration in a measurement target gas, an HC sensor (HC sensor element) for detecting the HC concentration, and the like.

DESCRIPTION OF REFERENCE NUMERALS 1 gas sensor
10, 10B, 10C sensor element
10h air introduction hole
10G hollow space
20 metal shell
110 pump cell
111, 111e solid electrolyte
112 outer electrode
113 inner electrode
114, 114B, 114C porous layer
115, 118, 118B dense layer
120 detection cell (Vs cell)
150 measurement chamber
151 diffusion resistance portion (first porous body)
161 heater
AX longitudinal direction (axial line)
This application claims priority from Japanese Patent Application No. 2019-081474 filed Apr. 23, 2019 and Japanese Patent Application No. 2019-219276 filed Dec. 4, 2019, the above-noted applications incorporated herein by reference in their entirety.

The invention claimed is:

1. A sensor element of a stacked type extending in a direction of an axial line thereof, the sensor element comprising:
   a measurement chamber;
   a pump cell including a solid electrolyte, an inner electrode formed on a surface of the solid electrolyte and exposed to the measurement chamber, and an outer electrode formed on another surface of the solid electrolyte and disposed outside the measurement chamber, the pump cell being configured to adjust an oxygen concentration in the measurement chamber by pumping out and pumping in oxygen in a measurement target gas introduced into the measurement chamber;
   a diffusion resistance portion disposed between outside and the measurement chamber and configured to adjust a diffusion rate of the measurement target gas introduced into the measurement chamber; and
   a detection cell configured to measure a concentration of a specific gas in the measurement target gas after the adjustment of the oxygen concentration, wherein
   the outer electrode is covered by a porous layer and is disposed in a hollow space surrounded by a first dense layer that has a gas non-permeable property and that prevents the outer electrode from coming into contact with the measurement target gas,
   the hollow space is in communication with an air introduction hole that is open on a rear side relative to the diffusion resistance portion, and the outer electrode is exposed via the porous layer to air introduced through the air introduction hole, and
   when viewed in a stacking direction, a heater is stacked on a side of the sensor element opposite to the first dense layer based on the solid electrolyte,
   when viewed in the stacking direction, the first dense layer, the solid electrolyte, the diffusion resistance portion, and the heater are stacked in this order,
   at least a part of the heater and the detection cell are contacted without a gap therebetween,
   the porous layer is disposed in an opening of a second dense layer, the second dense layer being disposed between the first dense layer and a composite layer that includes the solid electrolyte and an insulating layer, and
   side surfaces of the outer electrode are in direct physical contact with and embedded in the solid electrolyte.

2. The sensor element according to claim 1, wherein when viewed in a cross section along the stacking direction and perpendicular to the direction of the axial line, and when a cross-sectional area of the hollow space is defined as W1 and a cross-sectional area of the air introduction hole is defined as W2,
a relationship of $(1.5 \times W1) \geq W2 \geq (0.3 \times W1)$ is satisfied.

3. The sensor element according to claim 1, wherein the air introduction hole penetrates the first dense layer and is open on a front side relative to a rear end of the sensor element.

4. The sensor element according to claim 1, wherein the outer electrode contains a noble metal and a component of the solid electrolyte,
when a cross section of the outer electrode is observed, the outer electrode includes a noble metal region composed of the noble metal, a solid electrolyte region composed of the component of the solid electrolyte, and a coexistence region in which the noble metal and the component of the solid electrolyte coexist, and
the coexistence region is present along a boundary between the noble metal region and the solid electrolyte region.

5. The sensor element according to claim 1, wherein a width of the opening of the second dense layer is wider than a width of the hollow space along a width direction of the sensor element.

6. A gas sensor comprising:
the sensor element according to claim 1; and
a metal shell configured to hold the sensor element.

* * * * *